United States Patent
Sharma et al.

(10) Patent No.: US 7,280,546 B1
(45) Date of Patent: Oct. 9, 2007

(54) METHOD AND SYSTEM FOR PROVIDING WIRELESS INTERNET PROTOCOL ACCESS

(75) Inventors: Abhishek Sharma, Schaumburg, IL (US); Michael S. Borella, Naperville, IL (US); Todd Landry, Grayslake, IL (US); John T. Bartucci, Cary, IL (US)

(73) Assignee: UTStarcom, Inc., Alameda, CA (US)

( * ) Notice: Subject to any disclaimer, the term of this patent is extended or adjusted under 35 U.S.C. 154(b) by 910 days.

(21) Appl. No.: 10/304,656

(22) Filed: Nov. 25, 2002

(51) Int. Cl.
*H04L 12/28* (2006.01)

(52) U.S. Cl. ............ 370/401; 370/352; 370/338; 370/252; 370/335; 370/342

(58) Field of Classification Search .......... None
See application file for complete search history.

(56) References Cited

U.S. PATENT DOCUMENTS 6,347,091 B1 * 2/2002 Wallentin et al. ......... 370/437
6,978,382 B1 * 12/2005 Bender et al. ............ 726/4
2002/0085532 A1 * 7/2002 Kim ........................ 370/338
2004/0120277 A1 * 6/2004 Holur et al. .............. 370/328

* cited by examiner

*Primary Examiner*—Duc Ho
(74) *Attorney, Agent, or Firm*—McDonnell Boehnen Hulbert & Berghoff LLP

(57) ABSTRACT

A system and method for providing wireless Internet protocol access is provided. A network entity may be coupled to both a second generation and a third generation network access node. The network entity may intercept a request from a mobile node and determine whether the mobile node desires services from the second or third generation network. The network entity may then establish the proper communication session based on the type of session requested by the mobile node. By employing the network entity, service providers can effectively migrate from the second generation network architecture to the third generation architecture with minimal or no loss of services for users. Also, employing such a network entity enables users to operate a bi-functional mobile node, such as one that requires both second and third generation network access.

29 Claims, 10 Drawing Sheets

METHOD AND SYSTEM FOR PROVIDING WIRELESS INTERNET PROTOCOL ACCESS

FIELD OF THE INVENTION

The present invention relates to communications in mobile Internet Protocol ("IP") networks. More particularly, it relates to a method and system for IP wireless network access.

BACKGROUND

With the rapidly growing interest in wireless communications and Internet connectivity, wireless service providers are competing to capture the market share by offering their customers access to applications that take advantage of both technologies. However, as service providers attempt to widen their customer base, they are discovering inherent difficulties of providing combined voice and data services within circuit-switched networks. These infrastructures cannot meet the enormous demand for bandwidth or support timely, cost-effective delivery of emerging services and applications.

As the wireless market continues to grow at an increasing pace, service providers that rely on circuit-switched networks are facing mounting pressures since their systems cannot sustain increasing bandwidth requirements for new services and applications, and their networks lack the capacity to support the exponential rise in traffic. Such pressures put wireless network service providers at a disadvantage when they compete with other providers that have already begun to migrate to packet-based networks and thus are better prepared to respond quickly to market pressures.

To address these critical challenges, wireless data service providers are deploying next-generation data solutions that not only enable mobility, but also provide a framework for deploying emerging enhanced applications and services. First generation ("1G") analog wireless systems were initially employed by wireless service providers to provide wireless service. But 1G systems have since been replaced by networks referred to as the second-generation ("2G") wireless networks that provide increased speeds and capabilities. FIG. 1 is a block diagram illustrating a network architecture 100 that is typically employed in 2G wireless networks.

Referring to FIG. 1, a client terminal 102 communicates over an air interface 104 with a Base Station Controller ("BSC") 106. The client device 102 may be a code division multiple access ("CDMA") telephone having no Internet Protocol ("IP") capability, or a different client device, such as a wireless fax device, for instance. The BSC 106 is in turn coupled via a communication link 108 to a Mobile Switching Center ("MSC") 110, which serves to connect calls between various points in a network. The communication link 108 may include a Primary Rate Interface ("PRI") employing a plurality of communication and control channels, which are carried over T1 and/or E1 carrier lines. The MSC 110 is further connected by a voice data link 112 to a Public Switched Telephone Network ("PSTN") 114, which provides a path through which the MSC 110 may connect calls with a remote MSC and in turn with another client device, or a client device that may access the PSTN 114 via a modem connection 116, such as a client terminal 118 illustrated in FIG. 1.

Further, as illustrated in FIG. 1, the MSC 110 is in turn coupled via a communication link 120 to an Interworking Function ("IWF") 122. The communication link 120 may include a Frame Relay ("FR") communication link and/or a PRI, for instance. The IWF 122 is a hardware/software platform that serves as a gateway between a wireless network and a data packet network. The IWF 122 provides access to an IP network 126 and possibly the PSTN 114. The IWF 122 may reside within a service provider's central office or switching center and may connect directly to wireless switches. As illustrated in FIG. 1, the IWF 122 is coupled to the IP network 126 via a communication link 124 including, for example, an IP over Ethernet communication link. The IP network 126 may further provide communication links to other network entities or client devices. As illustrated in FIG. 1, the IP network 126 is coupled via a communication link 128 to a network server 130.

In the network architecture 100 illustrated in FIG. 1, processing of a call on the MSC 110 depends on call setup and management data received from the BSC 106. If the call is identified as a regular voice call, then the MSC 110 may initiate Signaling System 7 ("SS7") signaling to seize a trunk on an outgoing PRI to the PSTN 114. However, if a call is identified as a data or fax call, the MSC 110 switches the call to the IWF 122 over the FR link 120. Subsequently, the IWF 122 may convert the incoming circuit call into IP data packets that are sent to a destination via the IP network 126. Alternatively, in some deployments, the data packets may be sent back to the MSC 110 that may send the data packets over the PSTN 114 as a regular modem call.

FIG. 2 is a block diagram illustrating typical layered protocol stacks 200 for network devices from the exemplary system 100 illustrated in FIG. 1. Many functions of the network devices may be performed by a protocol. Such functions range from the specification of connectors, addresses of the communications nodes, identification of interfaces, options, flow control, reliability, error reporting, synchronization, etc. A set (also known as suite or stack) of protocols to carry out such functions is defined in FIG. 2 for the network devices. Each protocol in the suite handles one specific aspect of the communication. Lower (network) layers of the suite are primarily designed to provide a connection or path between users to hide details of underlying communications facilities, and upper (or higher) layers of the suite ensure that data is exchanged in correct and understandable form. A transport layer provides the connection between the upper (applications-oriented) layers and the lower (or network-oriented) layers.

The layered protocol stacks in FIG. 2 are described with respect to Internet Protocol suites comprising from lowest-to-highest, a physical, a link, a network, a transport, and an application layer. However, more or fewer layers could also be used, and different layer designations could also be used for the layers in the protocol stacks 200 (e.g., layering based on the seven layer Open System Interconnection ("OSI") model as developed by the International Organization for Standardization ("ISO")).

The layered protocol stacks are used to connect network devices to underlying physical transmission medium including a wireless network, a wired network, a wireless area network ("WAN") or a wired local area network ("LAN"), for instance. However, other computer networks could also be used.

FIG. 2 illustrates a client device 250, such as a personal computer, a telephone 252, the MSC 110, and the IWF 122. As is known in the art, a physical layer defines electrical and physical properties of an underlying transmission medium. The physical layer on the client device 250 includes an RS232 202 that is used to connect the client device 250 to a physical layer including RS232 212 on the telephone 252.

The physical link on the telephone 252 may also include a radio link protocol ("RLP") layer 214 that is used to connect to an RLP layer 224 on the MSC 110. In turn, the physical layer on the MSC 110 may also include a frame relay switched virtual circuit ("FRSVC") 226 layer including T1 or E1 links for connecting to the physical link including an FRSVC 236 on the IWF 122.

A link layer is used to connect network devices to the underlying physical transmission medium or physical layer. The link layer includes a Point-to-Point Protocol ("PPP") layer defining an Internet standard for transmission of IP packets over serial lines. The client device 250, the telephone 252, the MSC 110, and the IWF 122 include PPP layers 204, 216, 228, and 238, respectively, as their link layers. The IWF 122 further includes an Ethernet layer 240 ("ETH") for connecting to an IP network. However, it should be understood that other link layer protocols, such as a Medium Access Control ("MAC") protocol or IEEE 802.x protocols, could also be used.

Above the link layer, there is a network layer (also called the "Internet Layer" for Internet Protocol suites). The network layer includes an IP layer. Specifically, the client device 250, the telephone 252, the MSC 110, and the IWF 122 include IP layers 206, 218, 230, and 242, respectively.

Above the network layer, there is a transport layer. The transport layer includes a Transmission Control Protocol ("TCP") layer, for instance. The devices illustrated in FIG. 2 include TCP layers 208, 220, 232, and 244, respectively. The TCP provides a connection-oriented, end-to-end reliable protocol designated to fit into a layered hierarchy of protocols, which support multi-network applications. TCP provides reliable inter-process communication between pairs of network devices attached to distinct but interconnected networks. However, it should be understood that the transport layer may also include a User Datagram Protocol ("UDP").

Above the transport layer, there is an application layer including application programs. The network devices illustrated in FIG. 2 include application layers ("APP") 210, 222, 234, and 246, respectively. The application programs provide desired functionality to a network device (e.g., telephony or other communications functionality). For example, application programs may provide voice, video, audio, data or other applications. The application layer protocol may also include application protocol layers. Application protocol layers typically provide a subset of the functionality provided by an application program.

The application layer may include a Dynamic Host Configuration Protocol ("DHCP") application program or application protocol layer. DHCP is a protocol for passing configuration information such as IP addresses to network devices. The application layer may also include a Service Location Protocol ("SLP") application program or application protocol layer. As is known in the art, SLP provides a scalable framework for discovery and selection of network services. Additionally, the application layer may also include a Session Initiation Protocol ("SIP") application program or application protocol layer. SIP is an application layer control (signaling) protocol for creating, modifying and terminating sessions with one or more participants. The application layer may also include an ITU-T H.323 or H.324 application programs or application protocol layers. H.323 is the main family of video conferencing recommendations for IP networks. H.324 is a video conferencing recommendation using Plain-Old-Telephone Service ("POTS") lines. The application layer may also include a Voice-over-IP ("VoIP") application program or application protocol layer. VoIP typically comprises several application programs (e.g., H323, SIP, etc.) that convert voice signals into a stream of packets that may then be sent to a packet network.

While today's 2G wireless networks carry voice, limited data applications and provide short messaging services, next generation or third-generation ("3G") networks offer much greater capacity and significantly higher data rates, enabling service providers to offer enhanced data applications that go beyond traditional wireless e-mail and Internet access. FIG. 3 is a block diagram illustrating a network architecture 300 that is typically used in 3G networks.

Referring to FIG. 3, a client device 302 communicates with a client device 334 on an IP network 318 by means of three devices; a Radio Access Node ("RAN") 310, a Packet Data Serving Node ("PDSN") 314 and a home agent node 322. The client device 302 is coupled to the PDSN 314 via an air interface 304, a base station 306 and a communication link 308. The client device 302 may be a CDMA capable telephone having IP capability. In such an embodiment, the client device 302 may transmit PPP packets over the air interface 304 to the radio access node 310 that may encapsulate the received packets and forward them to the PDSN 314 via a communication link 312. The PDSN 314 performs traffic aggregation and acts as a foreign agent for mobile IP functionality.

As illustrated in FIG. 3, the PDSN 314 is further coupled to the IP network 318 via a communication link 316, and the IP network 318 is coupled to the home agent 322 via a communication link 320. The home agent 322 serves as an edge router, directing traffic to mobile client devices via foreign agents located within a service provider's network. Further, as illustrated in FIG. 3, the network 300 includes an Authentication, Authorization and Accounting ("AAA") server 332, such as a Remote Authentication Dial-In User Service ("RADIUS") server. As is known in the art, RADIUS enables remote access servers to authenticate users and to authenticate their access to the requested system or service. The AAA server 332 may reside on a visited (foreign) network or a home network. The PDSN 314 may employ the AAA server 332 to perform authentication during establishment of PPP sessions with mobile terminals. The PDSN 314 may also interact with the AAA server 332 during a mobile IP registration process.

Referring back to FIG. 3, the network architecture 300 further includes a media gateway 326 connected to the IP network via a communication link 324, and further connected to a PSTN 330 via a communication link 328. The media gateway 326 converts IP packets to standard voice calls for VoIP calls terminating on the PSTN 330.

As system providers migrate their equipment from 2G to 3G networks, they often need to replace many components and redesign their network architectures. Thus, a need exists for a system and method for supporting 2G to 3G network migration.

SUMMARY

In an exemplary embodiment, a method and system for providing wireless Internet protocol access is provided. The method may include, at a network entity that is configured to communicate with a first type of wireless access architecture and a second type of wireless access architecture, receiving a communication session request from a mobile node. The method further includes, at the network entity, determining a type of a communication session associated with the communication session request and establishing the communication session between the mobile node and either the first type of wireless access architecture or the second type of wireless access architecture based on the type of the communication session. For example, the network entity may establish the communication session between the mobile node and either a 2G or a 3G wireless network.

In another respect, the method may include, at a network entity that is configured to communicate with a first type of wireless access architecture and a second type of wireless access architecture, receiving a communication session request from a mobile node and determining if the communication session request is a voice communication session request. If so, the method may include sending a voice communication session request from the first network entity to a mobile switching center to establish a voice communication session between the mobile node and the first type of wireless access architecture. And if the communication session request is not a voice communication session request, the method may include determining that the communication session request is a data communication session request and sending the data communication session request from the first network entity to a data access node to establish a data communication session between the mobile node and the second type of wireless access architecture.

In still another respect, the exemplary embodiment may take the form of a network entity that may establish communication sessions in mobile Internet Protocol networks. The network entity may comprise a first switch configured to communicate with a first type of access node that is associated with a first type of wireless access architecture. The first switch may also be configured to receive a first communication session request from a first mobile node via the first type of access node. The network entity may also comprise a second switch coupled to the first switch and configured to communicate with a second type of access node that is associated with a second type of wireless access architecture. The network entity may receive the first communication session request, which has a communication type identifier, and determine if the communication type identifier is a first communication type. And if so, the first switch may establish a first communication session between the first mobile node and the first type of wireless access architecture. If the communication type identifier is a second communication type, the first switch may direct the second switch to establish a second communication session between the first mobile node and the second type of wireless access architecture.

In yet another respect, the exemplary embodiment may take the form of a system for providing wireless Internet protocol access. The system may include a first type of wireless access architecture configured to provide a first type of communication service and a second type of wireless access architecture configured to provide a second type of communication service. The system may further include a network entity coupled to the first and second type of wireless access architectures. The network entity may receive a communication session request from a mobile node and determine a type of a communication session associated with the communication session request. The network entity may then establish the communication session between the mobile node and either the first or second type of wireless access architecture based on the type of the communication session.

These as well as other aspects and advantages will become more apparent to those of ordinary skill in the art by reading the following detailed description, with reference to the accompanying drawings.

BRIEF DESCRIPTION OF THE DRAWINGS

Exemplary embodiments of the present invention are described with reference to the following drawings, in which.

DETAILED DESCRIPTION OF EXEMPLARY EMBODIMENTS

Figure 1:
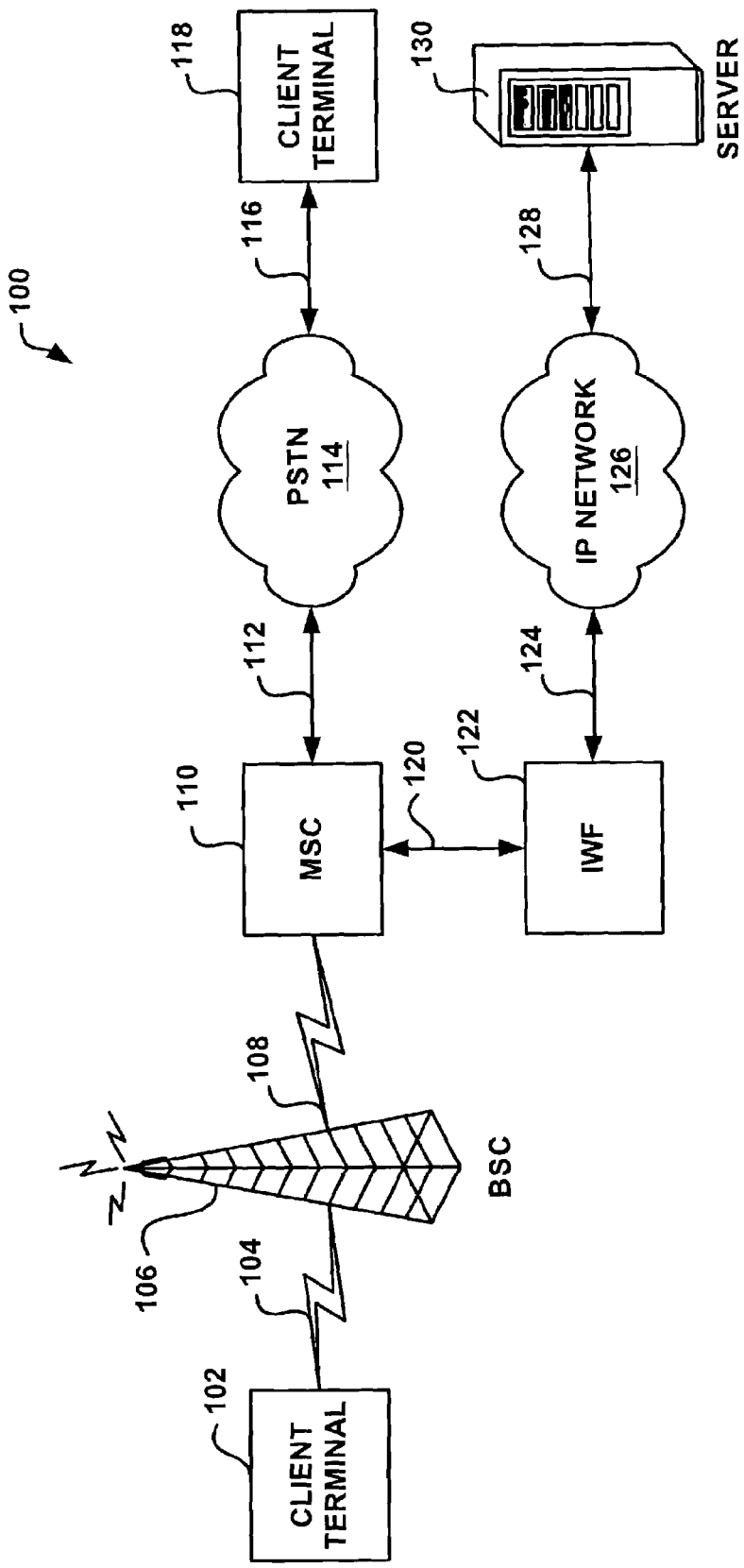
FIG. 1 is a block diagram illustrating a typical 2G network architecture.
Figure 2:
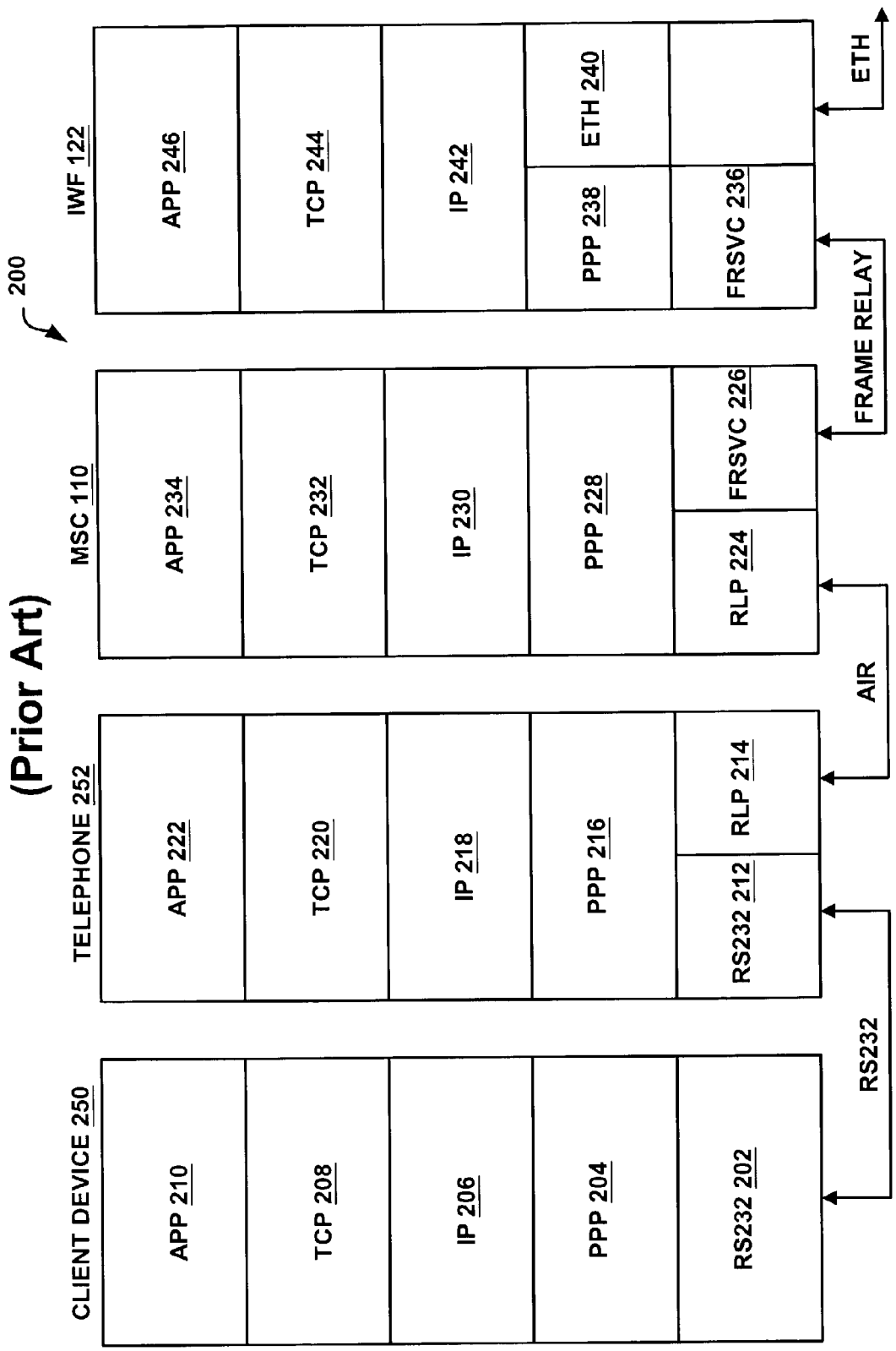
FIG. 2 is a block diagram illustrating a typical layered protocol stacks for network devices from the network illustrated in FIG. 1.
Figure 3:
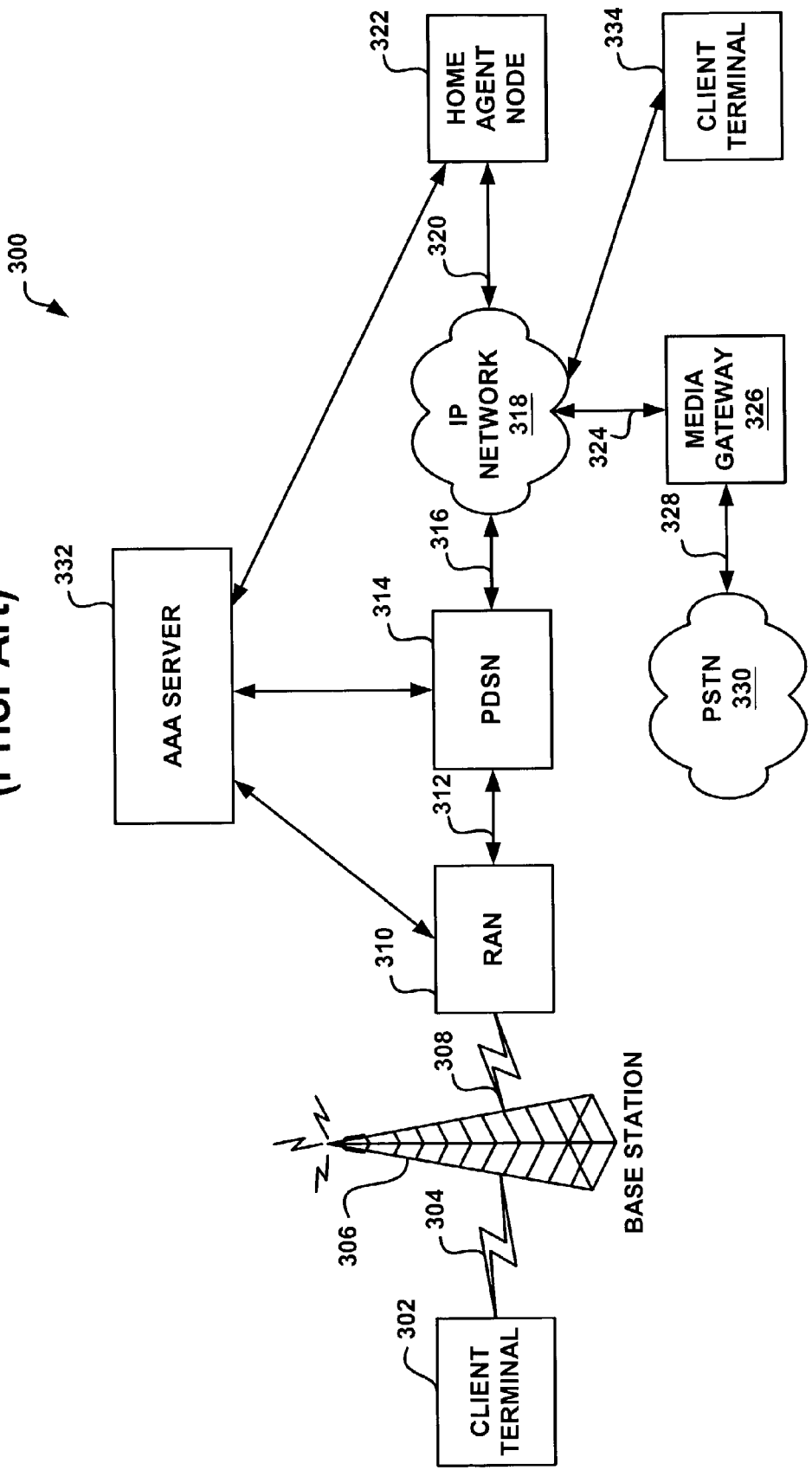
FIG. 3 is a block diagram illustrating a typical 3G network architecture.
Figure 4:
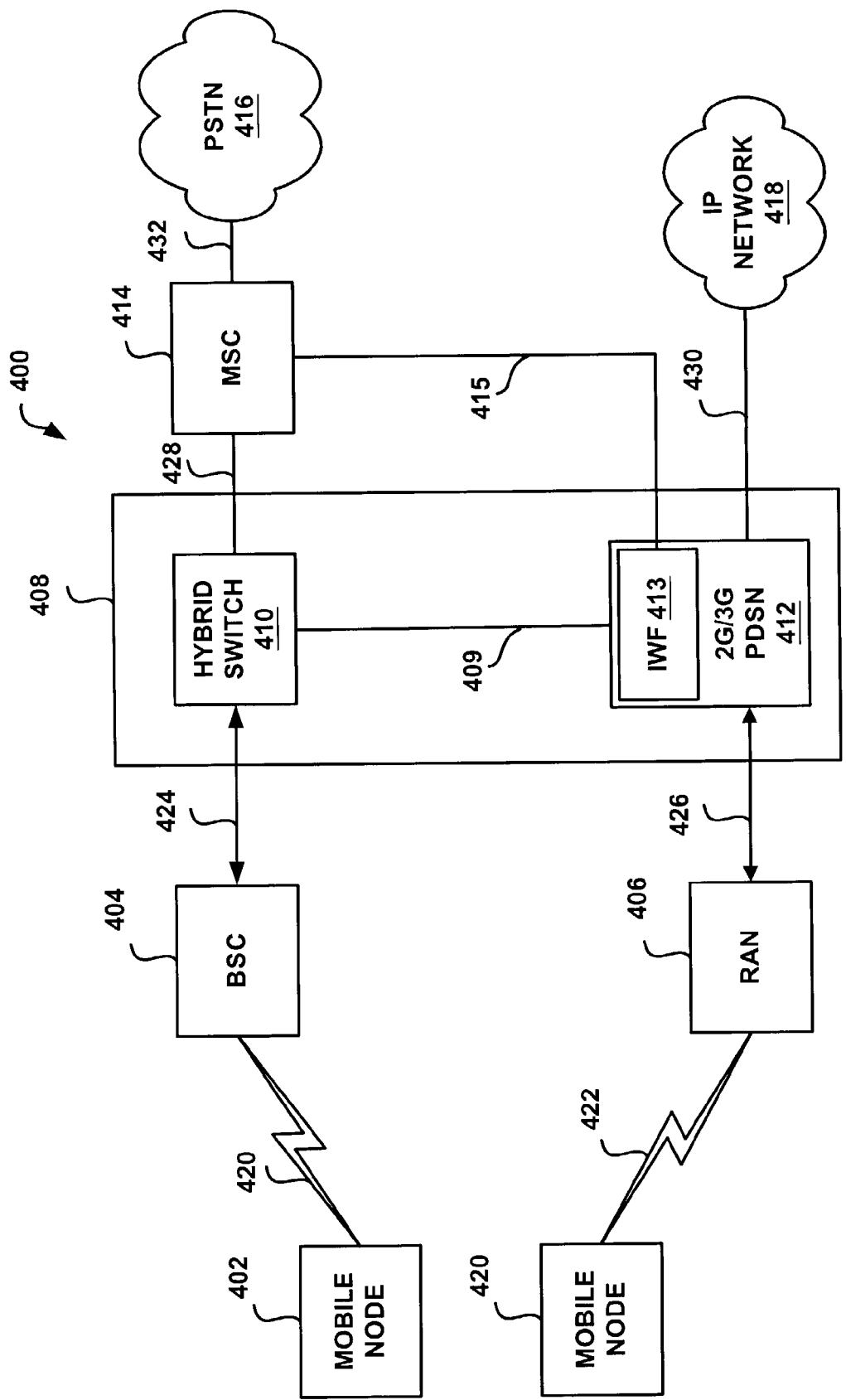
FIG. 4 is a block diagram illustrating an exemplary network architecture for providing IP wireless network access according to one exemplary embodiment of the present invention.

FIG. 4 is a functional block diagram illustrating an embodiment of a system 400 suitable for providing IP wireless access for client devices. It should be understood that this and other arrangements and processes described herein are set forth for purposes of example only, and other arrangements and elements (e.g., interfaces, functions, order of elements, etc.) can be used instead and some elements may be omitted altogether. Further, as in most telecommunications applications, those skilled in the art will appreciate that many elements described herein are functional entities that may be implemented as discrete components or in conjunction with other components, in any suitable combination or location.

As shown in FIG. 4, the system 400 includes a first mobile node 402, a second mobile node 420, a BSC 404, a RAN 406, and a network entity 408 including a hybrid switch 410 and a 2G/3G PDSN 412 with an IWF function 413. The hybrid switch 410 and the PDSN 412 are interconnected through an A10 and A11 Ethernet interface 409. The system 400 further includes an MSC 414, a PSTN 416, and an IP network 418. And the PDSN 412 is connected to the MSC 414 through a PRI interface 415.

In one embodiment, components of the exemplary system may be implemented using equipment form Commworks (a 3Com company). For example, the exemplary system 400 may include a Total Control Hub including Commworks Total Control Hub 1000 or 2000, and Total Control 1000 or 2000 Packet Data Serving Node Set. However, the exemplary embodiments are not limited to such equipment, and the exemplary system 400 could also be implemented using equipment from Cisco Systems of San Jose, Calif.; Lucent Technologies of Murray Hill, N.J.; Motorola, Inc. of Schaumburg, Ill.; Nokia Corporation of Helsinki, Finland, and others.

The first mobile node 402 communicates via a radio communication link 420 with a first type of access node, the BSC 404. BSC 404 is an interface between Base Transceiver Stations ("BTS") (not shown) and the PSTN 416. The system 400 may include many BTSs, which include one or more antennas arranged to produce radiation patterns to provide the link 420 with the BSC 404. BSC 404 also may handle radio resource management and radio network management functions for BTSs. According to an exemplary embodiment, the first type of access node (i.e., the BSC 404) is associated with a first type of wireless network, specifically a 2G wireless network. However, it should be understood that different embodiments are possible as well.

The second mobile node 420 communicates via a radio communication link 422 with a second type of access node, the RAN 406. The RAN 406 may include a BTS (or any other wireless access point) coupled to either a BSC or a packet control function ("PCF"), which selects a PDSN for new incoming communication sessions. The mobile node 420 can communicate via the radio communication link 422 to the BTS, which may connect to the BSC or PCF via a wired link. The BSC or PCF may then couple to a foreign agent, such as PDSN 412, over a generic route encapsulation ("GRE") tunnel such as a radio-protocol ("R-P") interface. (For more information on GRE see request for comments (RFCs) 1701–1702, the full disclosures of which are incorporated herein by reference). The R-P interface may comprise an A10 interface, which is used to transfer data by encapsulating data into GRE packets, and an A11 interface, which defines signaling procedures for managing A10 connections. (A-11 messages are based on mobile IP registration messages as defined in the Telecommunications Industry Association/Electronics Industries Alliance/Interim Standard 2001 (TIA/EIA/IS-2001), the full disclosure of which is incorporated herein by reference). According to an exemplary embodiment, the second type of access node (i.e., RAN 406) is associated with a second type of wireless network, specifically a 3G wireless network.

The mobile nodes 402 and 420 may take any suitable forms, such as, for instance, a telephone, a laptop computer, a fax, a wireless modem, or a personal digital assistant ("PDA"), for instance. According to an exemplary embodiment, the mobile node 402 may be a 2G-capable CDMA mobile node, and the mobile node 420 may be a 3G-capable CDMA mobile node. However, it should be understood that, in an alternative embodiment, the mobile node 402 or 420 may be a dual (2G- and 3G-capable) CDMA mobile node.

The BSC 404 and the RAN 406 may reside on the same radio network, such as the same CDMA radio network, or different radio networks, such as within two different CDMA radio networks. The BSC 404 and the RAN 406 are coupled to the network entity 408 via communication links 424 and 426, respectively. The communication link 424 may be a T1/PRI link, and the communication link 426 may be an R-P link.

The network entity 408 is further connected via a communication link 428 to the MSC 414 that is connected to the PSTN 416 via a communication link 432. The network entity 408 is also connected to an IP network 418 via a communication link 430. The communication links 428 and 432 may be PRI communication links, and the communication link 430 may be an IP communication link.

The network entity 408 includes the hybrid switch 410 and the 2G/3G PDSN 412. The hybrid switch 410 and the 2G/3G PDSN 412 may be application cards within the network entity 408. The hybrid switch 410 and the 2G/3G PDSN 412 may function as switches within the network entity 408 that routes incoming calls to a desired endpoint. Therefore, the network entity 408 may operate as a central control point to route incoming calls to the proper or desired destination. According to an exemplary embodiment, the network entity 408 is configured to communicate with both the first type of access node (BSC 404) and the second type of access node (RAN 406) and may receive communication session requests transmitted from mobile nodes via one of these access nodes. Further, according to an exemplary embodiment, when the network entity 408 receives a communication session request from mobile nodes 402 or 420, as will be described in greater detail below, the network entity 408 may determine a type of the requested communication session and may process the request based on the type of the request. For instance, when the network entity 408 receives a typical voice communication session request from the mobile node 402 via the BSC 404, the network entity 408 may send the request to the MSC 414. And when the network entity 408 receives a communication request from the mobile node 420 via the RAN 406, the network entity may establish a communication session with the IP network 418. In an embodiment in which the network entity 408 receives a data call request from the mobile node 402, the network entity 408 may offload data call processing from the MSC 414, the embodiments of which will be described in greater detail below.

According to an exemplary embodiment, the hybrid switch 410 monitors and relays signaling information between call control functions of the BSC 404 and mobility management functions of the MSC 414, and manages T1/T3 resources between the BSC 404 and the MSC 414. For example, T1 connections comprise DS1 signals, which include 24 DS0 (64 Kbps) signals transmitted using pulse-code modulation (PCM) and time-division multiplexing (TDM) and a T3 connection comprises 28 T1-lines. And the hybrid switch 410 may control routing of the signals through these T1/T3 connections. Further, the hybrid switch 410 can transmit user data directly from the BSC 404 to the 2G/3G PDSN 412 through the interface 409 to allow IP network 418 access to mobile node 402, which would normally be routed through the MSC 414 to the IP network 418.

The 2G/3G PDSN 412 may terminate PPP links of communication sessions from either 2G or 3G mobile nodes as well as TCP links for 2G asynchronous data communication sessions. Further, 2G/3G PDSN 412 may manage accounting and authentication of 2G and 3G users.

For a 3G user, such a mobile node 420, the network entity 408 may route a call as it normally would be routed if the entity were absent. The network entity 408 receives the call through the PDSN 412, which performs data encapsulation (and initiates tunnel registration with a home agent node if applicable), in order to send the call to the IP network 418. Similarly, for a 2G user such as mobile node 402, the network entity 408 will route a voice call as it normally would be routed if the network entity 408 were absent. However, the network entity 408 will route a 2G data call around the MSC 414 to the IP network 418 by sending the call to the PDSN 412, which in turn establishes a connection with the IP network 418.

Figure 5:
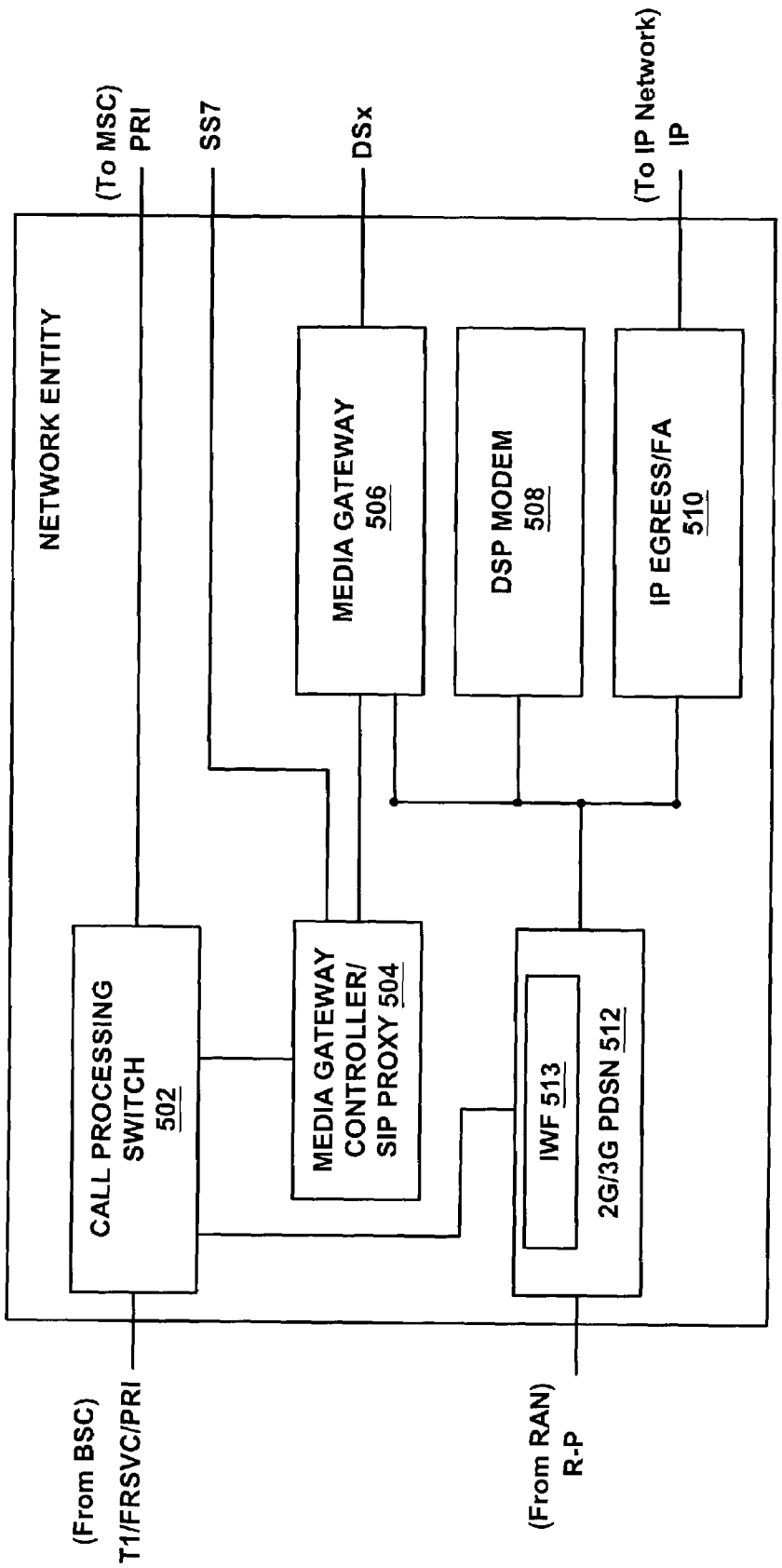
FIG. 5 is a block diagram illustrating a network entity for providing wireless access in a mobile IP network according to one exemplary embodiment of the present invention.

FIG. 5 is a block diagram illustrating a detailed view of a network entity 500, which provides wireless access in a mobile IP network, such as network entity 408 in FIG. 4, according to one exemplary embodiment. The network entity 500 includes a call processing switch 502, a media gateway controller/SIP proxy 504, a media gateway 506, a digital signal processing ("DSP") modem 508, an IP egress foreign agent 510, and a 2G/3G PDSN 512 which has an IWF function 513. FIG. 5 illustrates the 2G/3G PDSN 512 and the call processing switch 502 located in the same network entity 500. However, it should be understood that in an alternative embodiment, the call processing switch 502 and the 2G/3G PDSN 512 may be located on two discrete physical network entities. Further, it should be understood that the network entity 500 might also include management and route server application cards as well as interfaces to other network services such as AAA services. Moreover, functions of each of the components of the network entity 500 may be performed by a processor executing machine language instructions programmed to carry out the functions.

The call processing switch 502 includes input T1/FRSVC/PRI interfaces to one or more BSCs and an output PRI interface to one or more MSCs. The call processing switch 502 receives incoming communication requests from the BSC and if appropriate (as described below), routes the request directly to the MSC. The call processing switch 502 is connected to the media gateway controller/SIP proxy 504, which creates proxy messages to allow the network entity 500 to proxy requests through the media gateway 506 to an MSC via digital signal links ("DSx"). For instance, if the call processing switch 502 receives a request for a data call, the call processing switch 502 will send the call to the IWF 513 and also initiate a signaling connection with an MSC through the media gateway controller 504.

The 2G/3G PDSN 512 terminates an input R-P interface from one or more RANs and an output IP interface to an IP network via the IP egress/FA 510. The DSP modem 508 converts calls from the PDSN 512 into IP packets to be routed to a data packet transport network using any known data encapsulation technique, such as GRE data encapsulation.

Figure 6:
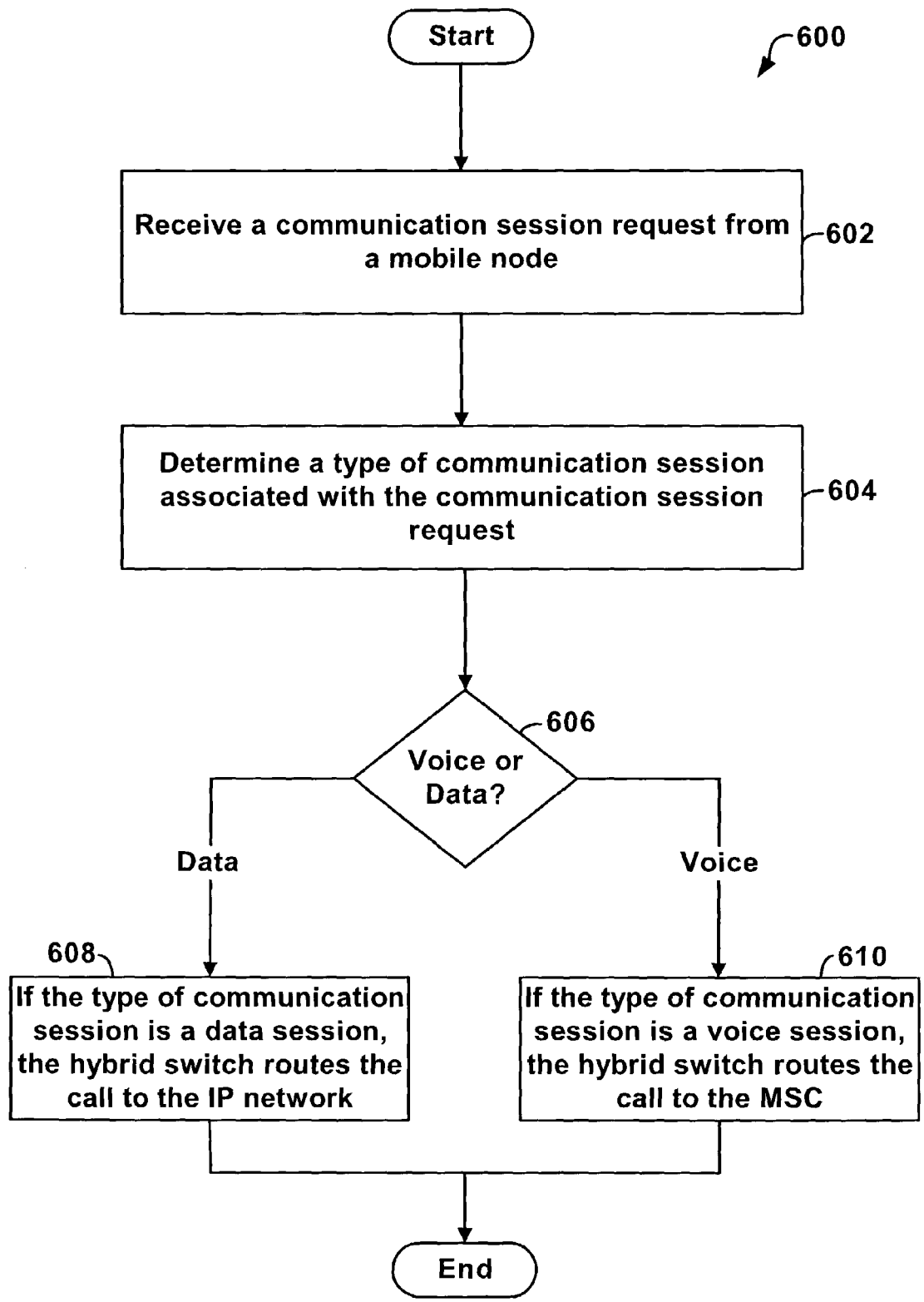
FIG. 6 is a flowchart depicting functional blocks according to one exemplary embodiment of the present invention.

FIG. 6 is a flowchart generally depicting a method 600 for establishing communication sessions in mobile IP networks using the network entity 500. As shown at block 602, the call processing switch 502 may receive a communication request from a mobile node. For example, the call processing switch 502 may detect and receive a new incoming communication session on the input T1/PRI interface. As shown at block 604, the call processing switch 502 then determines a type of communication session associated with the communication request. For example, the call processing switch 502 may determine if the incoming session is a data or voice session, such as a 2G voice or a 3G data session, possibly by reading an integrated services digital network ("ISDN") B channel of the T1/PRI interface. (The T1/PRI interface is a form of high bandwidth signaling that splits a single telephone line into 24 channels. Twenty-three channels are used for "actual traffic" and the remaining channel is devoted to signaling information. The channels on which traffic is carried are referred to as "B" channels. The channel devoted to signaling is referred to as the "D" channel. This means that, in terms of voice lines, 23 conversations can be held simultaneously over the same physical line.)

As shown at block 606, the call processing switch 502 determines if the type of communication session is a voice or data session. For example, as mentioned above, the call processing switch 502 can read the B channels of the T1/PRI interface to determine if voice or data is being sent by reading an identifier within the request or possibly by determining if the information being sent is characteristic of a voice or data call (e.g., voice calls may have less actively than data calls). In addition, the communication request may include a service option field with an identifier to distinguish between different types of calls and using that field, the call processing switch 502 may determine which type of call is being requested.

As shown at block 608, if the type of communication session is a data session, the call processing switch 502 routes the call to the IP network. For example, the call processing switch 502 may route the call to the IWF 513 of the PDSN 512, which converts the data call into IP packets and routes the IP packets to the IP egress/FA 510 to be sent to the IP network. As shown at block 610, if the type of communication session is a voice session, the call processing switch 502 routes the call to the MSC. For example, the call processing switch 502 may route the call to the output PRI interface that connects the call to an MSC.

Similarly, the 2G/3G PDSN 512 may detect and receive a new incoming communication session request on the input R-P interface. According to one exemplary embodiment, when the 2G/3G PDSN 512 detects an incoming VoIP communication session, the 2G/3G PDSN 512 may transmit the VoIP communication session via the media gateway 506 onto the DSx links, such as DS1 or DS3 links, for instance. The DSx links may then connect to the SS7 network to connect to the PSTN. Further, when the 2G/3G PDSN 512 detects an incoming data communication session, the 2G/3G PDSN 512 may route incoming data packets via the IP egress 510 to the IP network.

Figure 7:
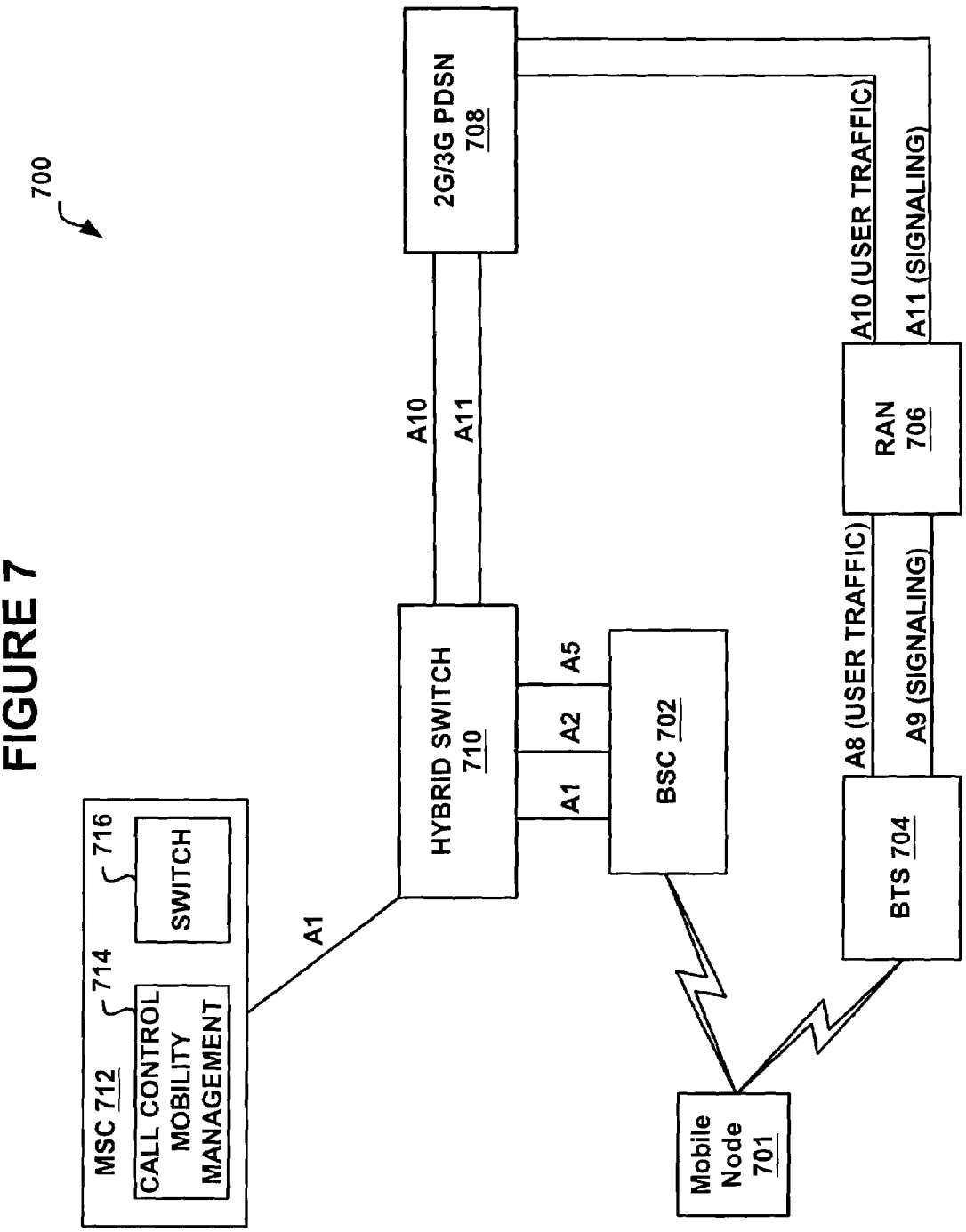
FIG. 7 is a block diagram illustrating an exemplary embodiment of a network access architecture illustrating protocol interfaces that may be used for providing wireless access in a mobile IP network according to one embodiment of the present invention.

FIG. 7 is a block diagram illustrating an exemplary embodiment of network access architecture 700 illustrating protocol interfaces that may be used in operation of the network entity 500 for providing wireless access in a mobile IP network.

The network access architecture 700 includes a first type of access device, a BSC 702, and a second type of access device, a RAN 706 including a PCF (not shown), a BTS 704, a 2G/3G PDSN 708, a hybrid switch 710, and an MSC 712 including a call control mobility management unit 714 and a switching unit 716. The BTS 704 and the RAN 706 may use A8 and A9 interfaces to communicate. The A8 interface may provide a path for user traffic between the BTS 704 and the RAN 706 and between BTSs (not shown) and a BSC. According to one embodiment, the A8 interface may carry data encapsulated using GRE, IP, link layer, or physical layer protocols. The A9 interface may provide a path for transmitting signaling information between the BTS 704 and the RAN 706 and between BTSs and a BSC. The A9 interface may carry data encapsulated using a TCP/UDP, IP, link layer, or physical layer protocols.

The RAN 706 may then communicate with the 2G/3G PDSN 708 via interfaces defined as A10 and A11. The A10 interface may be used to provide a path for user traffic and may carry data encapsulated using GRE, IP, link layer, or physical layer protocols. The A11 interface may be used to provide a path for signaling information and may carry data encapsulated using UDP, IP, link layer, or physical layer protocols. The 2G/3G PDSN 708 and the hybrid switch 710 also communicate via the A10 and A11 interfaces. According to an exemplary embodiment, the A10 interface between the hybrid switch 710 and the 2G/3G PDSN 708 may be a LAN/WAN based IP interface that the hybrid switch 710 may use to carry user data from the BSC 706 to an IWF function located on the 2G/3G PDSN 708. Further, the A11 interface may also be a LAN/WAN based IP interface, and the hybrid switch 710 may use this interface to carry signaling information from the MSC 712 to the IWF function on the 2G/3G PDSN 708.

The BSC 702 and the hybrid switch 710 may communicate via A1, A2, and A5 interfaces. Similarly, the hybrid switch 710 may communicate with the call control mobility management 714 via the A1 interface. The A1 interface may be used to carry signaling information between the call control and mobility management function 714 on the MSC 712 and the BSC 702. The A1 interface may carry data encapsulated using signaling connection control part ("SCCP") protocol, IOS application protocols, physical layer protocols, or multicast transport protocols ("MTP"), such as MTP1, MTP2, or MTP3. The A2 interface may carry PCM (voice/data) encoded data and provides an interface between the hybrid switch 710 and the BSC 702. The A5 interface between the BSC 702 and the hybrid switch 710 may be used to carry data for 2G data communication sessions. The A5 interface may carry data octet streams or intersystem link protocol ("ISLP").

Other interfaces may be used as well between entities of the network access architecture 700. For example, an A3 interface may be used to carry coded user information (voice/data) and signaling information between the hybrid switch 710 and the BSC 702. The A3 interface is composed of two parts: signaling and user traffic. The signaling information may be carried across a separate logical channel form the user traffic channel to control the allocation and use of channels for transporting user traffic. Additionally, an A7 interface may be used to carry signaling information between the BTS 704 and the RAN 706.

The information transmitted between entities of FIG. 7 may vary according to a specific implementation. As one example, information such as a type of the call (carried in a service option of a request), an actual speed of the call (e.g., service options are intended to represent the data speeds but the actual speed supported at the time a call is setup could be different), phone numbers (calling, callers etc.), additional Call Reference Values ("CRV") could be carried for call identification, or mobile equipment identifiers like Electronic Serial Numbers ("ESN") etc. could be sent between the entities.

Additionally, the A5 interface may exist between the hybrid switch 710 and the MSC 712 (not shown) to communicate data. For a standard 2G data call, data flows from the mobile node to the BSC (via BTS) to the MSC and then to IWF and beyond. However here, in one embodiment, the hybrid switch 710 may offload data traffic from the MSC 712. The hybrid switch 710 may monitor the signaling information that is exchanged between the BSC 702 and the MSC 712. And during an offload situation, the hybrid switch 710 may only send the call setup information to the MSC 712 on the A1 link and the actual data is sent to the 2G/3G PDSN (or IWF function) after it is received from the BSC 702 so that it can be routed to the IP network more efficiently rather than traveling through the PSTN. Alternatively, the hybrid switch 710 may not send any setup information to the MSC 712 if the call is a data call. The A1 interface between the hybrid switch 710 and the MSC 712 therefore, may be omitted. The hybrid switch 710 may monitor the A1 messaging to determine what physical links the call data will travel from the BSC 702. This may require cooperation from the MSC 712 so that the MSC 712 is aware of that the control and data planes are split and the MSC 712 is now handling only the A1 links and not the A5 links (e.g., the links carrying data).

Offloading traffic from MSCs may be beneficial since a service provider may be unable to add new subscribers to their 2G networks due to overloaded MSCs. The hybrid switch 710 could proxy voice calls onto the PSTN (when they do not contain data) and offload the data call processing from the MSCs onto the 2G/3G PSDN. The MSC can still be aware that the call is setup since it will receive signaling information (through the A1 interfaces), however data can be routed by the hybrid switch 710 around the MSC. Alternatively, signaling information does not have to be sent to the MSC when offloading a data call because the call is not routed through the MSC.

An A5 link may not exist between the MSC 712 and the hybrid switch 710, since data calls can be offloaded from the MSC, except for asynchronous data or fax calls where the IWF may dial out to a PSTN network to complete the call because in such an instance, a PRI link to the MSC 712 may be necessary to reach the PSTN network. In this scenario, the MSC 712 only terminates the PSTN links (which is half of the call) and the hybrid switch 712 still offloads the other half of the call from the MSC 712. Without offloading, data would flow from the mobile node to the MSC 712 through a BTS and then possibly to an IWF. However, employing the offloading technique, data only travels from a mobile node to a BTS to the hybrid switch 710 and then to the IWF or PDSN 708. Other types of calls that may typically be routed through the MSC may not require a PSTN connection and, in those cases, the hybrid switch 710 may completely offload the MSC 712.

Figure 8:
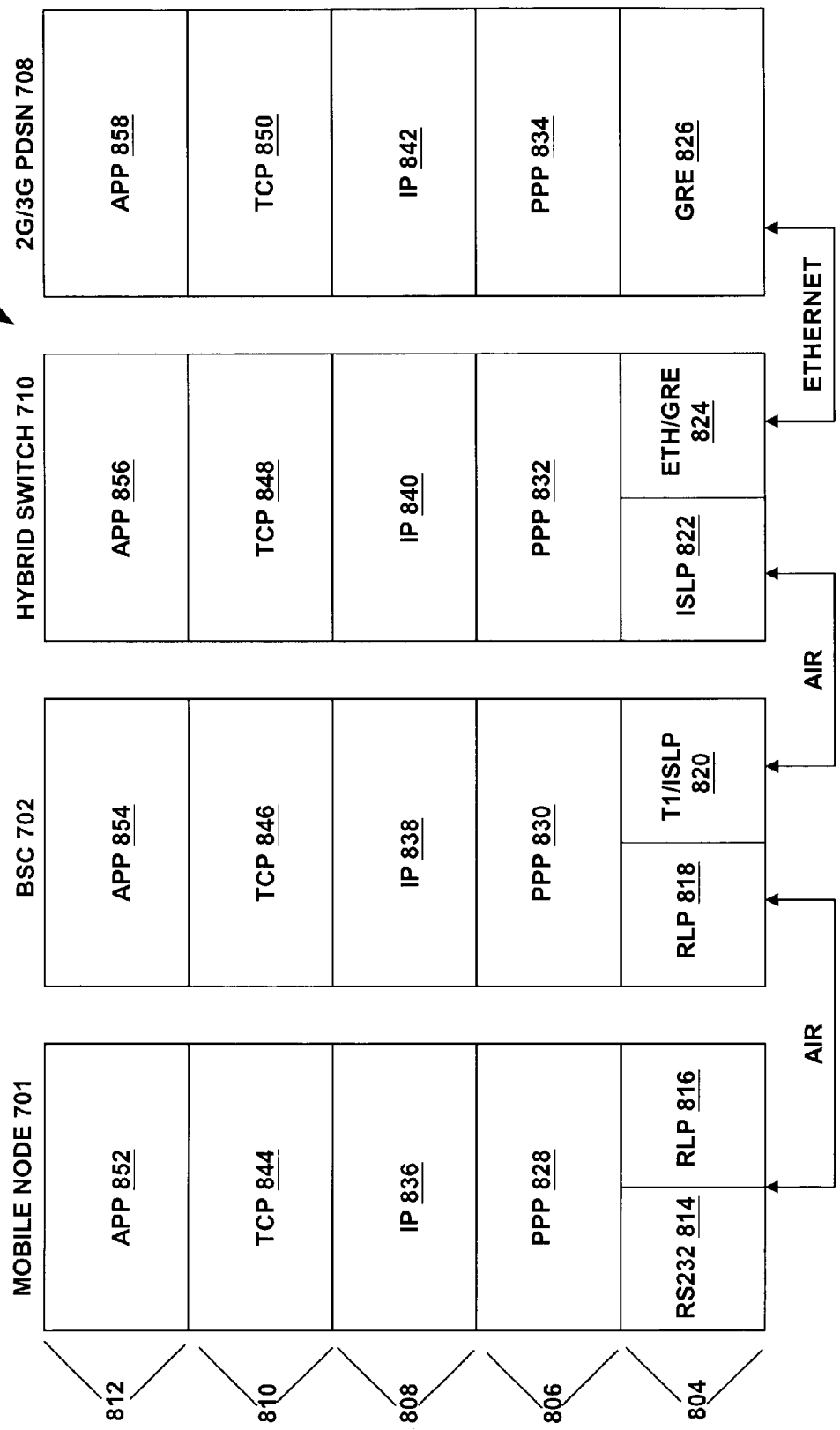
FIG. 8 is a block diagram illustrating exemplary layered protocol stacks for network devices from the exemplary network illustrated in FIG. 7.

FIG. 8 is a block diagram illustrating exemplary layered protocol stacks 800 for the hybrid switch 710, which may define signaling between the hybrid switch 710 and other entities of the network access architecture 700. For example, the layered protocol stacks 800 may define connections, signaling and applications of the A1, A2, A5, A8, A9, A10, and A11 interfaces. The layered protocol stacks are described with respect to IP suites comprising, from lowest to highest, a physical layer 804, a link layer 806, a network layer 808, a transport layer 810, and an application layer 812. However, it should be understood that more or fewer layers could also be used, and different layer designations could also be used for the layers in the protocol stacks 800.

The layered protocol stacks are used to connect network devices to underlying physical transmission medium including a wireless network, a wired network, a WAN or a LAN, for instance. However, other computer networks could also be used.

The physical layer 804 on the mobile node 701 includes an RS232 814 connection or an RLP 816 connection that is used to connect to an RLP 818 on the BSC 702. The physical layer on the BSC 702 also includes a T1/ISLP 820 that is used to connect to an ISLP 822 on the hybrid switch 710. The physical layer on the hybrid switch 710 further includes Ethernet/GRE layer 824 that is used to connect to a GRE layer 826 on the 2G/3G PDSN 708. The link layer 806 on the illustrated devices includes PPP layers 828, 830, 832, and 834. The network layer 808 on the devices includes IP layers 836, 838, 840, and 842. The transport layer 810 includes TCP layers 844, 846, 848, and 850 on the illustrated devices, and the application layer 812 includes application programs 852, 854, 856, and 858.

In addition to DHCP, SLP, SIP, H.323, and H.324, the application layers may also include a Domain Name System ("DNS") application program or application protocol layer.

The DNS provides replicated distributed secure hierarchical databases that hierarchically store resource records under domain names. The application layers may also include an AAA application program or application protocol layer. AAA includes a classification scheme and exchange format for accounting data records. The application layers may also include a Simple Network Management Protocol ("SNMP") application program or application protocol layer. SNMP is used to support network management functions.

Figure 9:
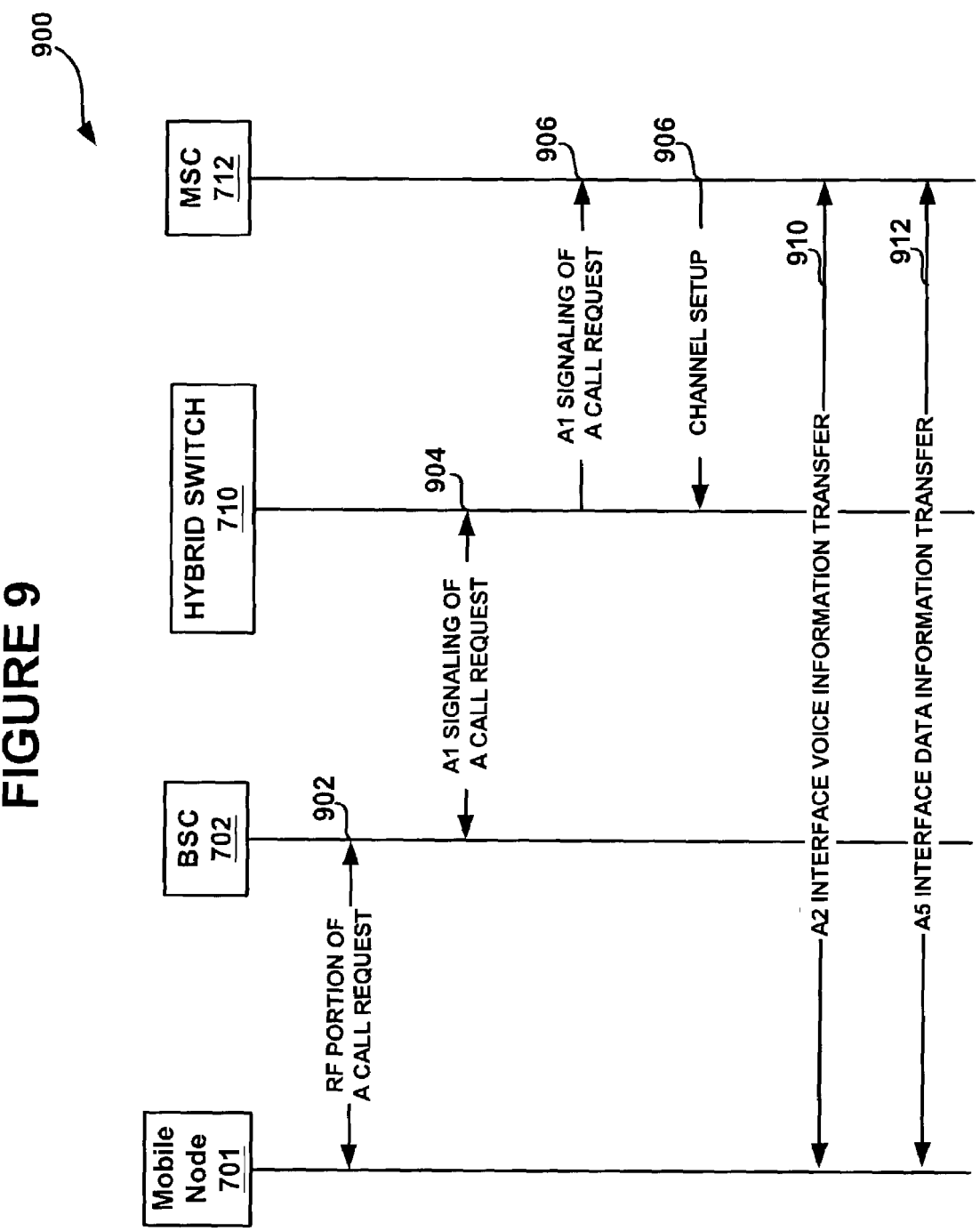
FIG. 9 is a block diagram illustrating a message sequence scenario for providing wireless network access in a network architecture using a hybrid switch according to one exemplary embodiment of the present invention.

FIG. 9 is a block diagram illustrating a message sequence scenario 900 (i.e., a sample call flow model) for providing wireless network access in a network architecture using a hybrid switch within the network access architecture 700. The message sequence scenario 900 illustrates a 2G voice and data call setup and communication.

Initially, at step 902, assume the mobile node 701 communicates with the BSC 702 to set up RF resources. The mobile node 701 may send an origination message over an access channel of the air interface to the BSC 702, and the BSC 702 may acknowledge the receipt of the origination message with a base station acknowledgement order message to the mobile node 701. And if the BSC 702 can determine that resources, e.g., a traffic channel, are not available, the BSC 702 can decline the origination message.

At step 904, the BSC 702 communicates with the hybrid switch 710 to set up RF resources through the A1 signaling interface. The BSC 702 may construct a service request message and send it to the hybrid switch 710. At step 906, the hybrid switch 710 sends an A1 bearer channel setup message to the MSC 712. According to an exemplary embodiment, the A1 message includes a request to allocate physical T1 or T3 resources. Further, the A1 message may specify a type of communication session being setup for the mobile node 701. According to one exemplary embodiment, the communication session for mobile node 701 is a 2G voice and data call.

At step 908, the MSC 712 sends an A1 bearer channel setup reply message to the hybrid switch 710. According to an exemplary embodiment, the A1 reply message identifies a T1 channel that was allocated for the incoming session. Alternatively, if an authentication failure occurred, because of a malicious mobile node operating on the network without authorization, then the MSC 712 may simply clear or drop the call. At step 910, the mobile node 701 and the MSC 712 can communicate through an A2 interface to send and receive voice information. And, at step 912, the mobile node 701 and the MSC 712 can also communicate through an A5 interface to send and receive data.

Figure 10:
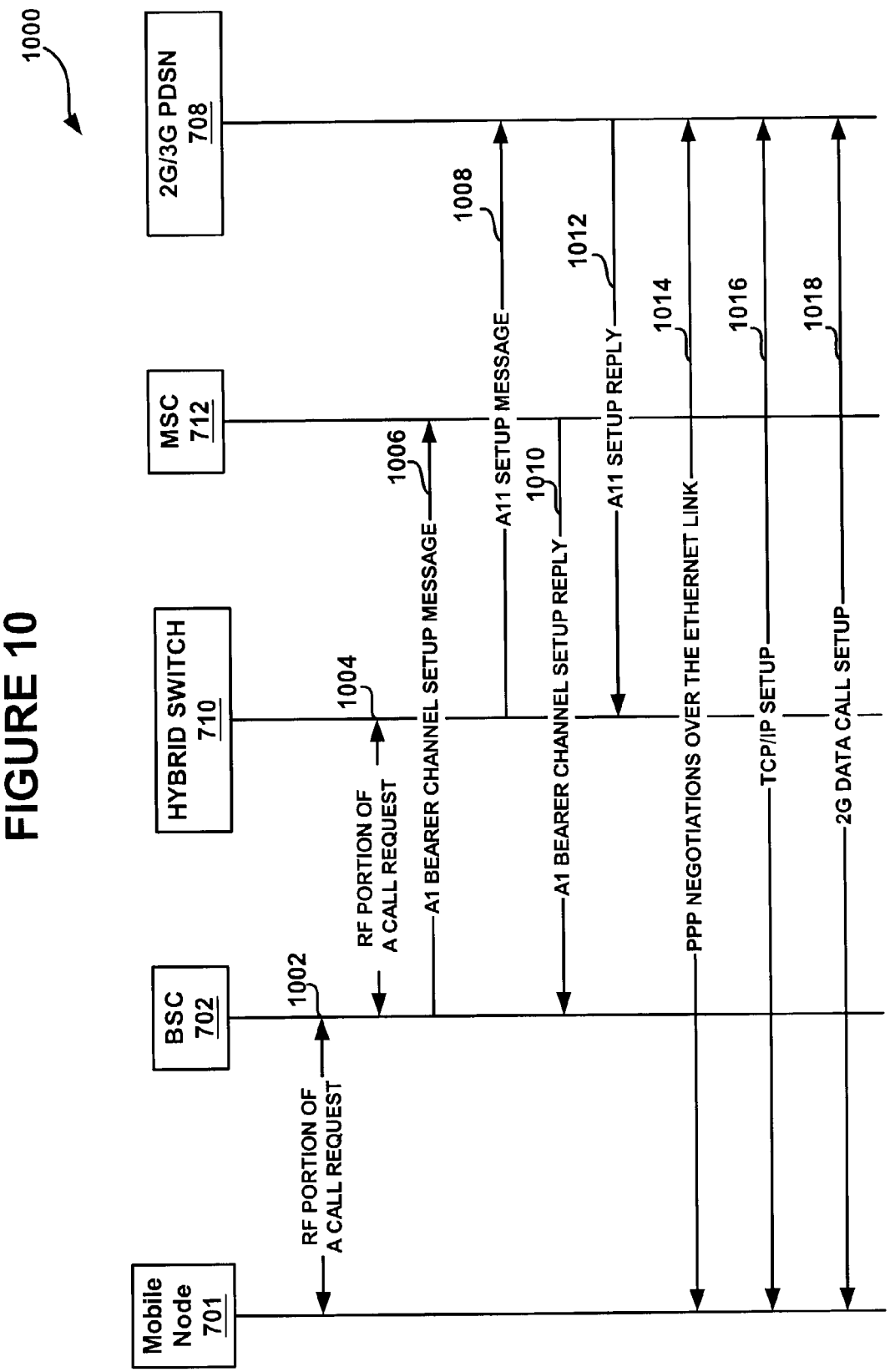
FIG. 10 is a block diagram illustrating another message sequence scenario for providing wireless network access in a network architecture using a hybrid switch according to one exemplary embodiment of the present invention.

FIG. 10 is another block diagram illustrating a message sequence scenario 1000 for providing wireless network access in a network architecture using a hybrid switch within the network access architecture 700. The message sequence scenario 1000 illustrates an instance where in the past, the MSC 712 would normally handle the call, however using the hybrid switch 710 according to embodiments of the present invention, the call can be offloaded from the MSC 712. Initially, at step 1002, assume the mobile node 701 communicates with the BSC 702 to set up RF resources, such as through a paging channel within a CDMA system. In one embodiment, the mobile node 701 may send an origination message over an access channel of the air interface to the BSC 702, and the BSC 702 may acknowledge the receipt of the origination message with a base station acknowledgement order message to the mobile node 701. And if the BSC 702 can determine that resources, e.g., a traffic channel, are not available, the BSC 702 may decline the origination message.

At step 1004, the BSC 702 communicates with the hybrid switch 710 to set up RF resources. The BSC 702 may construct a service request message and send it to the hybrid switch 710. Messaging may not be needed between the mobile node 701 and the hybrid switch 710 for setting up the RF resources because that is handled by the BSC 702 in conjunction with MSC 712 for authorization and authentication of the mobile node 701. This can be done using an A1 link between the BSC 702 and the MSC 712.

At step 1006, the BSC 702 sends an A1 bearer channel setup message to the MSC 712. According to an exemplary embodiment, the BSC 702 sends the A1 setup message via the hybrid switch 710, and the A1 message includes a request to allocate physical T1 or T3 resources. Further, the A1 message may specify a type of communication session being setup for the mobile node 701. According to one exemplary embodiment, the communication session for mobile node 701 is a 2G data call. When the hybrid switch 710 detects the A1 bearer channel setup message 1006, the hybrid switch 710 sends an A11 setup message 1008 to the 2G/3G PDSN 708. The hybrid switch may know which PDSN to send the A11 messages to by using a table of configured PDSN identifiers and to create an error control identifier with the mobile node's international mobile subscriber identity (IMSI) to choose one of them. In another embodiment, the hybrid switch 710 may query a foreign agent control node (FACN) that manages the available PDSNs and returns the IP address of an available PDSN in an initial A11 reply that the hybrid switch 710 could use to establish the A10 tunnel/PPP link.

At step 1010, the MSC 712 sends an A1 bearer channel setup reply message to the BSC 702. According to an exemplary embodiment, the A1 reply message is sent via the hybrid switch 710 and identifies a T1 channel that was allocated for the incoming session. Alternatively, if an authentication failure occurred, because of a malicious mobile node operating on the network without authorization, then the MSC 712 may simply clear or drop the call.

At step 1012, the 2G/3G PDSN 708 sends an A11 setup reply message to the hybrid switch 710. The reply message may indicate that the call has been properly routed to the IP network.

At step 1014, the MN 701 and the 2G/3G PDSN 708 use an Ethernet link to negotiate PPP parameters for the communication session. At step 1016, the mobile node 701 and the 2G/3G PDSN 708 set up TCP/IP resources and, at step 1018, a 2G data call communication session is established between the mobile node 701 and the 2G/3G PDSN 708, efficiently offloading the data call from the MSC 712.

FIGS. 9 and 10 illustrate examples of how a network entity may determine a type of a communication session requested by the mobile node 701. In the example illustrated in FIG. 9, the hybrid switch 710 determined that the mobile node 701 requested 2G network access, therefore the hybrid switch 710 setup a communication link between the mobile node 701 and the MSC 712. However, had the mobile node 701 made a request for 3G network access, the hybrid switch 710 may determine such and establish a communication link between the mobile node 701 and the PDSN 708. Alternatively, FIG. 10 illustrates an example where the hybrid switch 710 determined that mobile node 701 requested 2G data access, therefore, the hybrid switch 710 sent the call via an A10 and A11 interface to the PDSN 708 to establish a connection between the mobile node 701 and the IP network.

A gradual upgrade from a 2G network to a 3G network can be done with the implementation of the hybrid switch as described within the present invention. As the 3G network is being built out, the hybrid switch allows for a carrier to migrate a hardware platform from a 2G network to a 3G network simply by replacing an application card within a network entity.

It should be understood that the programs, processes, methods and systems described herein are not related or limited to any particular type of computer or network system (hardware or software), unless indicated otherwise. Various types of general purpose or specialized computer systems supporting the IP networking may be used with or perform operations in accordance with the teachings described herein.

In view of the wide variety of embodiments to which the principles of the present invention can be applied, it should be understood that the illustrated embodiments are examples only, and should not be taken as limiting the scope of the present invention. For example, the steps of the flow diagrams may be taken in sequences other than those described, more or fewer steps may be used, and more or fewer elements may be used in the block diagrams. While various elements of the preferred embodiments have been described as being implemented in software, in other embodiments in hardware or firmware implementations may alternatively be used, and vice-versa.

Further, it will be apparent to those of ordinary skill in the art that methods involved in the system for packet session control may be embodied in a computer program product that includes a computer readable medium. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

We claim:

1. A method for establishing communication sessions in mobile Internet Protocol networks, the method comprising:
    at a network entity that is configured to communicate with a first type of wireless access architecture and a second type of wireless access architecture, receiving a communication session request from a mobile node;
    at the network entity, determining a type of a communication session associated with the communication session request; and
    the network entity establishing the communication session between the mobile node and either the first type of wireless access architecture or the second type of wireless access architecture based on the type of the communication session,
    the network entity establishing the communication session between the mobile node and the first type of wireless access architecture by establishing a traffic channel between the mobile node and a mobile switching center (MSC),
    the network entity establishing the communication session between the mobile node and the second type of wireless access architecture if the type of the communication session is a data communication session,
    if the communication session request is sent from a mobile node operating according to the first type of wireless access architecture and the type of the communication session is the data communication session, then the network entity establishes the communication session between the mobile node and the second type of wireless access architecture in order to route the communication session around the MSC.

2. The method of claim 1, wherein the network entity comprises a hybrid switch configured to receive the communication session request from the mobile node via a base station controller.

3. The method of claim 2, wherein the network entity comprises a packet data service node configured to receive the communication session request from the mobile node via a radio access network.

4. The method of claim 3, wherein determining the type of the communication session associated with the communication session request comprises determining whether the type of the communication session comprises the data communication session.

5. The method of claim 4, wherein establishing the communication session comprises establishing the communication session via the packet data service node if the type of communication session comprises the data communication session.

6. The method of claim 5, further comprising routing data associated with the communication session via the network entity to the packet data service node.

7. The method of claim 2, wherein determining the type of the communication session associated with the communication session request comprises determining whether the type of the communication session comprises a voice communication session.

8. The method of claim 7, wherein establishing the communication session comprises establishing the communication session via a mobile switching center if the type of communication session comprises the voice communication session.

9. The method of claim 1, wherein receiving the communication session request from the mobile node comprises the mobile node sending the communication session request to the network entity via the traffic channel.

10. The method of claim 9, wherein determining the type of the communication session associated with the communication session request comprises reading the traffic channel between the network entity and the mobile node to determine if voice or data is being sent.

11. The method of claim 1, wherein determining the type of the communication session associated with the communication session request comprises identifying a communication type identifier within the communication request that distinguishes between different types of communication sessions.

12. A method for providing wireless Internet Protocol IP access, the method comprising:
    at a network entity that is configured to communicate with a first type of wireless access architecture and a second type of wireless access architecture, receiving a communication session request from a mobile node;
    determining if the communication session request is a voice communication session request and if so,
    sending the voice communication session request from the network entity to a mobile switching center so as to establish a voice communication session between the mobile node and the first type of wireless access architecture and if not,
    determining that the communication session request is a data communication session request; and sending the data communication session request from the network entity to a data network so as to establish a data communication session between the mobile node and the second type of wireless access architecture.

13. The method of claim 12, wherein the network entity is a hybrid switch, the first type of wireless access architecture is a second generation network access architecture, and the second type of wireless access architecture is a third generation network access architecture.

14. The method of claim 12, wherein determining if the communication session request is the voice communication session request and determining that the communication session request is the data communication session request comprises identifying a communication type identifier within the communication request that distinguishes between the data and voice communication sessions.

15. A network entity for establishing communication sessions in mobile Internet Protocol networks, the network entity comprising:
 a first switch configured to communicate with a first type of access node that is associated with a first type of wireless access architecture and configured to receive a first communication session request from a first mobile node via the first type of access node; and
 a second switch coupled to the first switch and configured to communicate with a second type of access node that is associated with a second type of wireless access architecture,
 the first communication session request has a communication type identifier, and if the communication type identifier is a first communication type, the first switch establishes a first communication session between the first mobile node and the first type of wireless access architecture, and if the communication type identifier is a second communication type, the first switch directs the second switch to establish a second communication session between the first mobile node and the second type of wireless access architecture.

16. The network entity of claim 15, wherein the first switch is a hybrid switch and the first type of access node is a base station controller.

17. The network entity of claim 15, wherein the second switch is a packet data service node and the second type of access node is a radio access node.

18. The network entity of claim 15, wherein the first switch includes a processing unit operable to execute machine language instructions stored in data storage to perform at least one function selected from the group consisting of extracting the first communication type identifier from the first communication session request, determining whether the communication type identifier corresponds to the first or second communication type, establishing the first communication session between the first mobile node and the first type of wireless access architecture, and directing the second switch to establish the second communication session between the first mobile node and the second type of wireless access architecture.

19. The network entity of claim 15, further comprising an interworking function (IWF) operable to convert the first communication session request into data packets if the communication type identifier is the second communication type to be sent to the second type of wireless access architecture.

20. The network entity of claim 15, wherein the second switch is configured to receive a second communication session request from a second mobile node via the second type of access node and to establish a session between the second mobile node and the second type of wireless access architecture.

21. The network entity of claim 15, wherein the first switch is configured to communicate with the first type of access node through an intersystem link protocol (ISLP).

22. The network entity of claim 15, wherein the network entity has layered protocol stacks selected from the group consisting of a physical layer operating according to an intersystem link protocol (ISLP) and an Ethernet and generic route encapsulation (GRE) protocol, a link layer operating according to a point-to-point protocol (PPP), a network layer operating according to an Internet protocol (IP), a transport layer operating according to a transmission control protocol (TCP), and an application layer operating according to an application specific protocol.

23. A system comprising:
 a first type of wireless access architecture configured to provide a first type of communication service;
 a second type of wireless access architecture configured to provide a second type of communication service; and
 a network entity coupled to the first and second type of wireless access architectures, the network entity operable to receive a communication session request from a mobile node and to determine a type of a communication session associated with the communication session request, and the network entity operable to establish the communication session between the mobile node and either the first or second type of wireless access architecture based on the type of the communication session,
 the network entity establishing the communication session between the mobile node and the first type of wireless access architecture by establishing a traffic channel between the mobile node and a mobile switching center (MSC),
 the network entity establishing the communication session between the mobile node and the second type of wireless access architecture if the type of the communication session is a data communication session,
 if the communication session request is sent from a mobile node operating according to the first type of wireless access architecture and the type of the communication session is the data communication session, then the network entity establishes the communication session between the mobile node and the second type of wireless access architecture in order to route the communication session around the MSC.

24. The system of claim 23, wherein the first type of wireless access architecture is a second generation wireless architecture and the second type of wireless access architecture is a third generation wireless architecture.

25. The system of claim 23, wherein the network entity includes a hybrid switch configured to receive the communication session request from the mobile node and determine the type of a communication session associated with the communication session request.

26. The system of claim 23, wherein the network entity establishes the traffic channel with the MSC via an interface selected from the group consisting of an A1 interface and an A5 interface.

27. The system of claim 23, wherein the network entity establishes the communication session between the mobile node and the first type of wireless access architecture if the type of the communication session is a voice communication session.

28. The system of claim 23, wherein the network entity establishes the communication session between the mobile node and the second type of wireless access architecture by establishing a traffic channel between the mobile node and a data network.

29. The system of claim 28, wherein the network entity establishes the traffic channel with the data network via an interface selected from the group consisting of an A10 interface and an A11 interface.

* * * * *